US009117389B2

(12) United States Patent
Zhang et al.

(10) Patent No.: US 9,117,389 B2
(45) Date of Patent: Aug. 25, 2015

(54) DOME-SCREEN DEVICE, DOME-SCREEN PLAYING SYSTEM AND IMAGE GENERATION METHOD THEREOF

(71) Applicant: Shenzhen YuanWang cocotop Technology Co., Ltd., Shenzhen (CN)

(72) Inventors: Leping Zhang, Shenzhen (CN); Bing Yang, Shenzhen (CN); Yong Pan, Shenzhen (CN)

( * ) Notice: Subject to any disclaimer, the term of this patent is extended or adjusted under 35 U.S.C. 154(b) by 230 days.

(21) Appl. No.: 13/654,214

(22) Filed: Oct. 17, 2012

(65) Prior Publication Data

US 2013/0093785 A1    Apr. 18, 2013

(30) Foreign Application Priority Data

Oct. 18, 2011    (CN) .......................... 2011 1 0316568
Aug. 27, 2012    (CN) .......................... 2012 1 0307682

(51) Int. Cl.
*G03B 21/14* (2006.01)
*G09G 3/00* (2006.01)
*H04N 9/31* (2006.01)

(52) U.S. Cl.
CPC .............. *G09G 3/003* (2013.01); *H04N 9/3141* (2013.01); *H04N 9/3197* (2013.01)

(58) Field of Classification Search
CPC ........ G03B 21/10; G03B 21/14; G03B 21/28; H04N 9/3141; H04N 9/3197
USPC ............... 353/10, 30–31, 78–79, 94, 98, 119; 362/241, 247, 248, 240, 303, 347, 516, 362/800; 359/204.2, 463, 479, 619, 629; 348/36, 48, 743–747

See application file for complete search history.

(56) References Cited

U.S. PATENT DOCUMENTS

| 6,612,701 B2 * | 9/2003 | Westort et al. ................... 353/10 |
| 2002/0067467 A1 * | 6/2002 | Dorval et al. .................... 353/10 |
| 2007/0193123 A1 * | 8/2007 | Magpuri .............................. 52/8 |
| 2011/0019153 A1 * | 1/2011 | Lee et al. .......................... 353/8 |
| 2011/0211256 A1 * | 9/2011 | Connor ......................... 359/463 |
| 2014/0247433 A1 * | 9/2014 | Piehler ............................ 353/94 |

* cited by examiner

*Primary Examiner* — Sultan Chowdhury
(74) *Attorney, Agent, or Firm* — James M Smedley LLC; James M. Smedley, Esq.

(57) ABSTRACT

The present invention discloses a spherical-screen device, a spherical-screen playing system and an image generating method for image rectification. The method includes the steps of: equally dividing an arc curve of a spherical screen, which corresponds to a radian of 90°, into a plurality of segments; equally dividing a straight line of a planar image corresponding to the arc curve into a plurality of segments, the number of the segments of the straight line being equal to the number of the segments of the arc curve; assigning an image parameter of a first point in the planar image to a third point in a planar image; and connecting a sphere center with a second point of a to-be-displayed image position on the arc curve that corresponds to the first point, a point falling in the planar image being the third point.

16 Claims, 14 Drawing Sheets

DOME-SCREEN DEVICE, DOME-SCREEN PLAYING SYSTEM AND IMAGE GENERATION METHOD THEREOF

CROSS REFERENCE TO RELATED APPLICATIONS

This application claims the benefit of Chinese Patent Application No. 201110316568.0, filed Oct. 18, 2011, the entire disclosure of which is incorporated herein by reference. This application claims the benefit of Chinese Patent Application No. 201210307682.1, filed Aug. 27, 2012, the entire disclosure of which is incorporated herein by reference.

BACKGROUND OF THE INVENTION

1. Technical Field

The present invention relates to an LED 360° fully-spherical-screen (i.e., dome-Screen) device, an LED 360° fully-spherical-screen playing system and an image forming method thereof, and more particularly, to a fully-spherical-screen device, a fully-spherical-screen playing system and an image generating method thereof.

2. Description of Related Art

In the prior art, spherical-screen (i.e., dome-screen) devices are always technologies toward which large film and entertainment facilities strive to evolve. As the LED display technologies are improved currently, it has become possible to dispose an LED spherical screen. An LED 360° spherical-screen film device which emits light towards the interior of the spherical screen and plays an image is formed by emitting half-lines towards eight vertices from a center of a cubic to divide a spherical surface into six identical regions, and accordingly setting a fixing holder and an external structural holder, where a plurality of LED lamp panels and corresponding drive circuit boards are mounted.

However, in the existing LED spherical-screen device, LED lamps and lamp panels are usually assembled in rows and columns. The current image technologies are all to convert planar images into spherical images having a certain radian, so it is impossible for the existing LED lamp panel display to overcome the problem of non-uniform arrangement of the LED lamps and lamp panels, and it is also impossible to solve the problem of display with certain radian, which will deteriorate distortion of the images. Consequently, it is still impossible to produce large-scale LED 360° spherical-screen devices through industrialization in the prior art.

As virtual perception is increasingly demanded, displaying manners of the images are updated continuously, and one of the displaying manners is spherical-screen displaying.

Fully-spherical-screen playing is the best way to make a film vivid because an image is usually seen by a person in such a way that: light from different directions enter into the person's eyes and are then formed into the image through retina. The spherical screen can simulate images seen by the person in different viewing directions so that the person feels that the scene seen by him or her is real.

Nowadays, the fully-spherical-screen playing is generally achieved by means of a fisheye (digital or optical) projector or some other projector. Such a digital or optical projector has a service life that is necessarily not long because it requires a high brightness. In addition, almost all the existing projectors have a relatively low projection resolution, so some problem will occur if a plurality of different projectors are used when need to be spliced. Moreover, as the number of the projectors used is increased, consumption of associated materials is increased, which also adds to the cost.

Accordingly, the prior art still needs to be improved and developed.

BRIEF SUMMARY OF THE INVENTION

An objective of the present invention is to provide a spherical-screen device and an image generating method thereof, which makes it convenient to accomplish image generation and to reduce image distortion.

A further objective of the present invention is to provide a spherical-screen playing system and an image generating method thereof to solve the problems with the spherical-screen playing system in the prior art such as a short service life, a low projection resolution and a high cost.

The technical solutions of the present invention are as follows.

The present invention provides an image generating method for a spherical-screen device, which adopts the following steps for image rectification:

equally dividing an arc curve of a spherical screen, which corresponds to a radian of 90°, into a plurality of segments;

according to a planar image that needs to be displayed, equally dividing a straight line of the planar image corresponding to the arc curve into a plurality of segments, the number of the segments of the straight line being equal to the number of the segments of the arc curve;

assigning an image parameter of a first point in the planar image to a third point in a planar image;

connecting a sphere center with a second point of a to-be-displayed image position on the arc curve that corresponds to the first point, a point falling in the planar image being the third point; and displaying the rectified planar image on the arc curve on the corresponding LED spherical screen.

Preferably, LED lamps are disposed at the second point.

Preferably, the spherical-screen device is set in such a way that:

a spherical surface can be divided into six identical curved-surface regions by connection lines between the center of the spherical surface and the projection points, the projection points are created on the spherical surface when half-lines are emitted from the center of the spherical surface towards eight vertices of a cube whose gravity center coincides with the center of the spherical screen, and each of the curved surfaces has a radian of 90°;

each of the curved surfaces is equally divided into n parts to obtain a distribution diagram with n equisection points, wherein n is a natural number; and the LED lamps are disposed at the n equisection points of the distribution diagram.

The present invention provides a spherical-screen device adopting the image generating method, which comprises a spherical-screen structure formed by a plurality of LED lamp panels spliced together, wherein LED lamps on the LED lamp panels are disposed at a second point and are displayed according to corresponding image parameters.

Preferably, the spherical-screen structure adopts at least one module formed by a plurality of LED lamp panels spliced together, and the at least one module is fixed on a holder.

Preferably, the holder comprises a plurality of delta connectors, each of the delta connectors is disposed in 8 curved-surface regions with the same area of a spherical screen, and each of the curved-surface regions is formed by three rings which are perpendicular to each other and are disposed along a spherical surface.

Preferably, a plurality of spliced LED lamp panels are further disposed in curved-surface sub-regions divided by the delta connectors.

Preferably, adjacent ones of the LED lamp panels are spliced at an angle of 120°~180°.

Preferably, an upright post is further disposed outside the holder, the upright post is supported on the ring at the equator, and a module support frame on which the LED lamp panels are hooked is further disposed in the holder.

Preferably, an elevator parallel with the upright post is disposed in the spherical screen, and walls of the elevator are made of a transparent material.

The present invention further provides a spherical-screen playing system, which comprises:

a light source disposed inside a spherical screen; and a playing apparatus for playing a film, wherein the light source is an LED lamp device, and the playing apparatus comprises a plurality of playing modules.

Preferably, each of the playing modules further comprises a CPU control module, a display drive module, and an AC/DC power conversion module which are connected to each other.

Preferably, the LED lamp device is distributed inside the spherical screen in the manner of module angle equipartition or isometric point extraction.

Preferably, the LED lamp device is a full-color LED lamp device consisting of LED lamps of three primary colors (RGB).

The present invention further provides an image generating method for the spherical-screen playing system, which is adapted to distribute each point, at which an image is played, inside the spherical screen uniformly. The image generating method comprises the following steps of:

S1. dividing the spherical screen into six curved surfaces with the same area, each of the curved surfaces having a radian of 90°;

S2. equally dividing each of the curved surfaces into n parts to obtain a distribution diagram with n equisection points, wherein n is a natural number; and s, wherein n is a natural number; and S3. disposing the light source on the distribution diagram with the n equisection points.

Preferably, the step S1 further comprises:

S11. taking a vector from a central point of the spherical screen to any point on the spherical screen as a rotating vector; and S12. rotating the rotating vector in six directions, i.e., upwards, downwards, leftwards, rightwards, frontwards and backwards, by 90° respectively to divide the spherical screen into six curved surfaces.

The spherical-screen device and the image generating method thereof of the present invention adopt the image rectification method to achieve image restoration on the spherical screen, and are particularly suitable for achieving image displaying of an LED 360° spherical-screen device.

In the spherical-screen playing system and the image generating method thereof of the present invention, the spherical-screen playing system comprises a light source disposed inside a spherical screen and a playing apparatus for playing a film, wherein the light source is an LED lamp device, and the playing apparatus comprises a plurality of playing modules. By controlling one or more of the playing modules to play one or more video images, the problem of high-resolution playing is solved. Meanwhile, using the LED lamp device, which has a long service life and a good illumination effect, as the light source can bring better enjoyment for the audience.

DETAILED DESCRIPTION OF THE INVENTION

Hereinafter, preferred embodiments of the present invention will be described in more detail with reference to the attached drawings.

Figure 1:
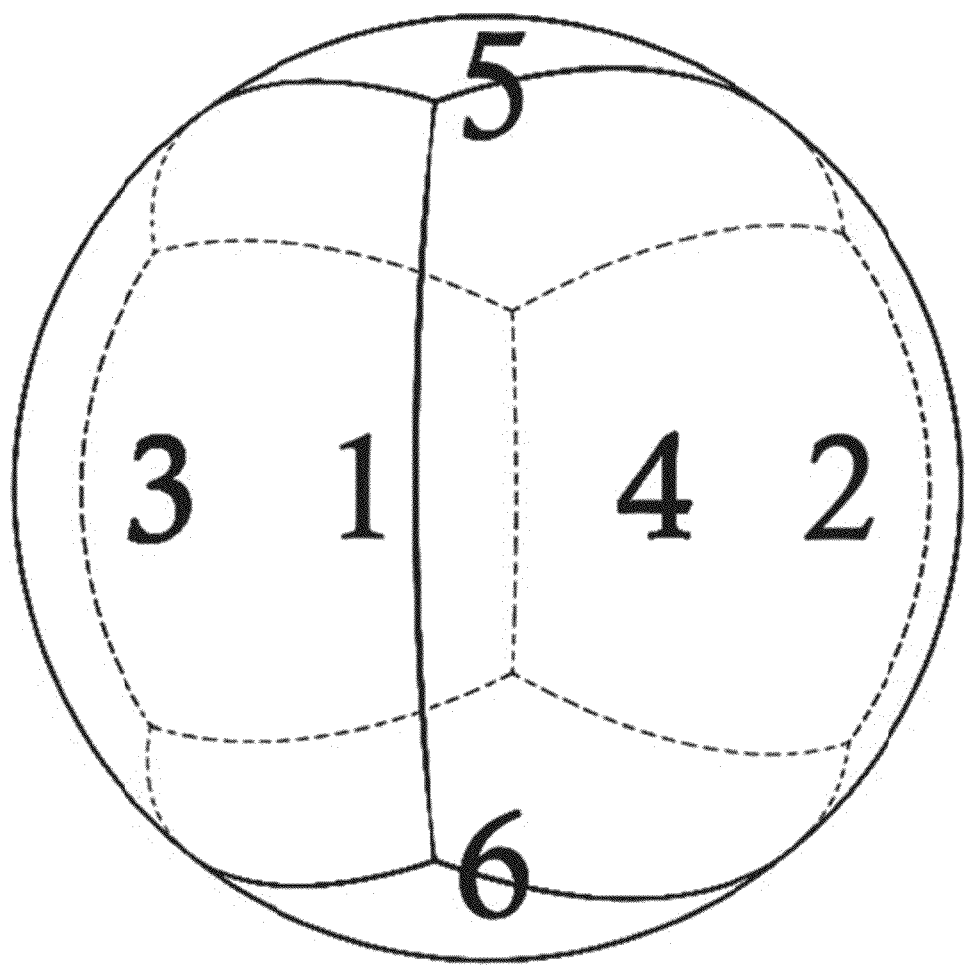
FIG. 1 is a schematic view illustrating a spherical screen of a spherical-screen device of the present invention which is divided into six curved surfaces.
Figure 2:
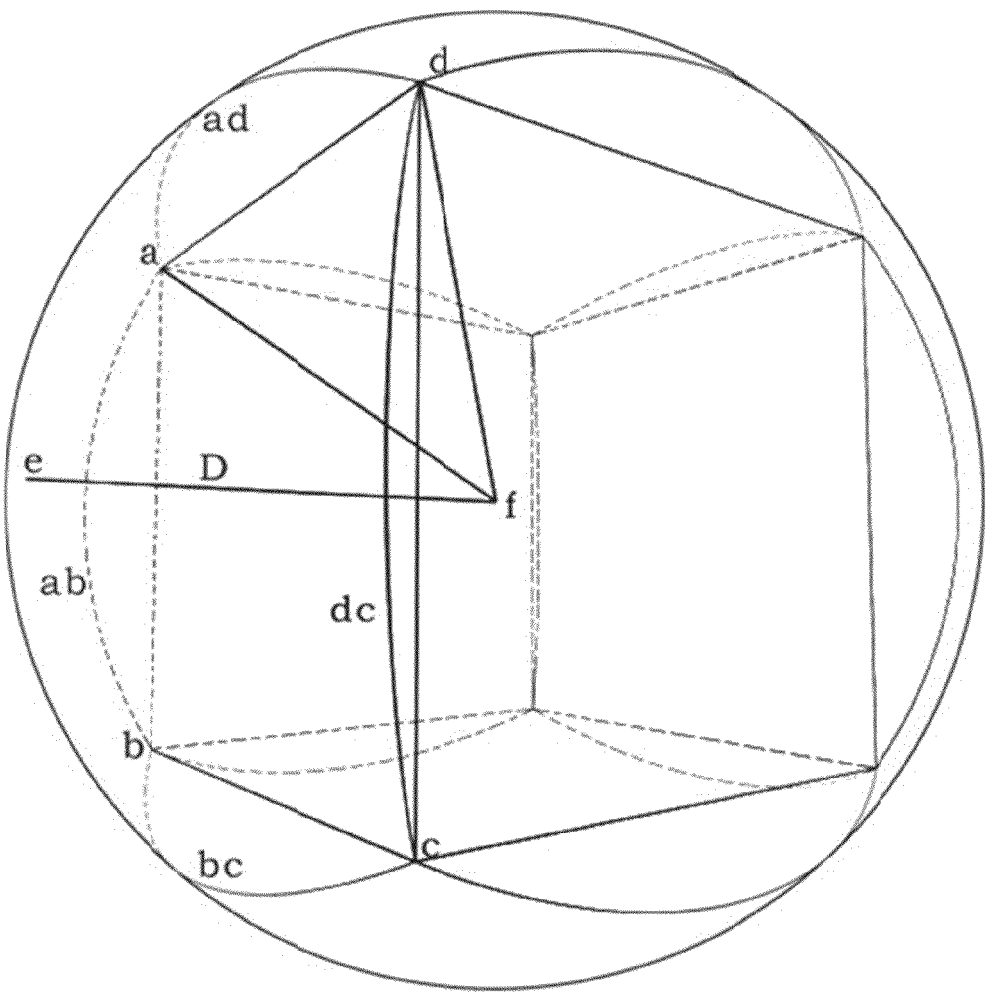
FIG. 2 is a schematic view illustrating an arc length of a curved surface of the spherical-screen device of the present invention which is equally divided into n parts.

As shown in FIG. 1 and FIG. 2, in a preferred embodiment of a spherical-screen device of the present invention, a spherical surface can be divided into six identical curved-surface regions by connection lines between the center of the spherical surface and the projection points, the projection points are created on the spherical surface when half-lines are emitted from the center of the spherical surface towards eight vertices of a cube whose gravity center coincides with the center of the spherical screen. Then, the curved-surface regions are further divided into n modules. Each of the modules is formed into an irregularly-shaped LED display screen, and the irregularly-shaped LED display screens constitute the entire LED 360° spherical-screen device.

Because the number of the modules is too large, m of the modules must further form a larger module, which is assembled into a case to form a unitary structure. In this way, the installation duration and the error can be reduced. Meanwhile, the case unit is required to have an appropriate size to facilitate movement and hoisting. The larger module consisting of the m (which may be a square of 4, 9, 16 or the like) modules can be installed in a case which may be made of a material such as metal or plastic. The symbols m and n used in the specification of the present invention are both natural numbers for the counting, and real values thereof are determined according to practical requirements.

Figure 3:
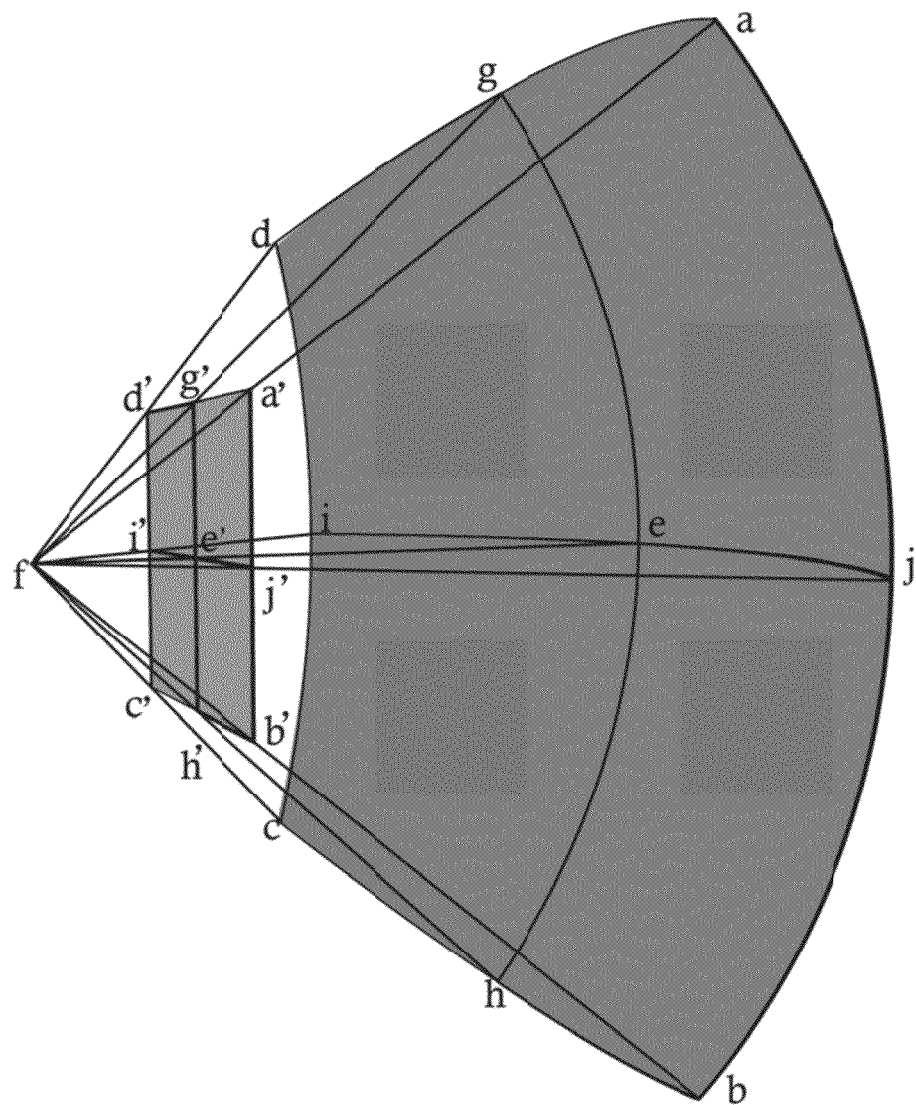
FIG. 3 is a schematic view illustrating an image generating method of the present invention.
Figure 4:
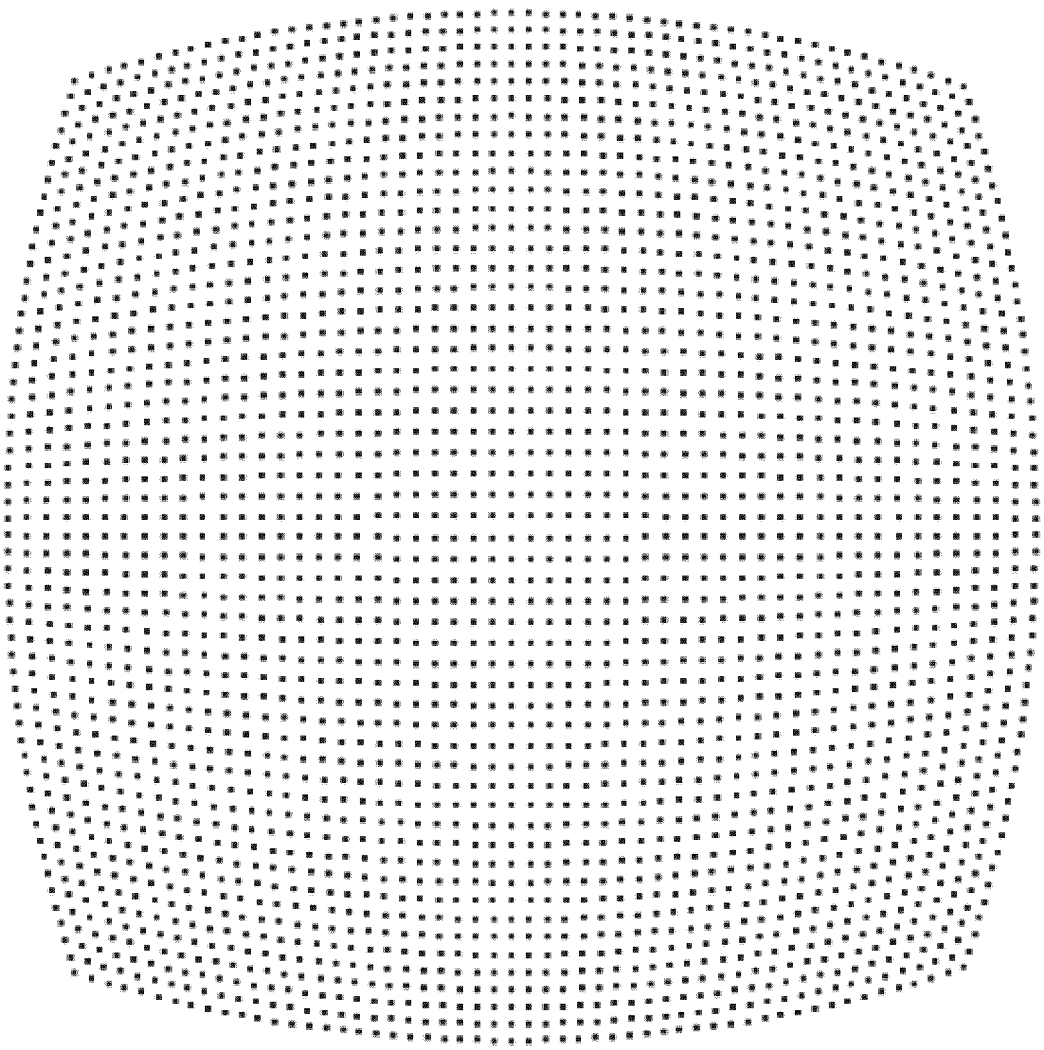
FIG. 4 is a schematic view illustrating arrangement of LEDs of the spherical-screen device of the present invention.
Figure 5:
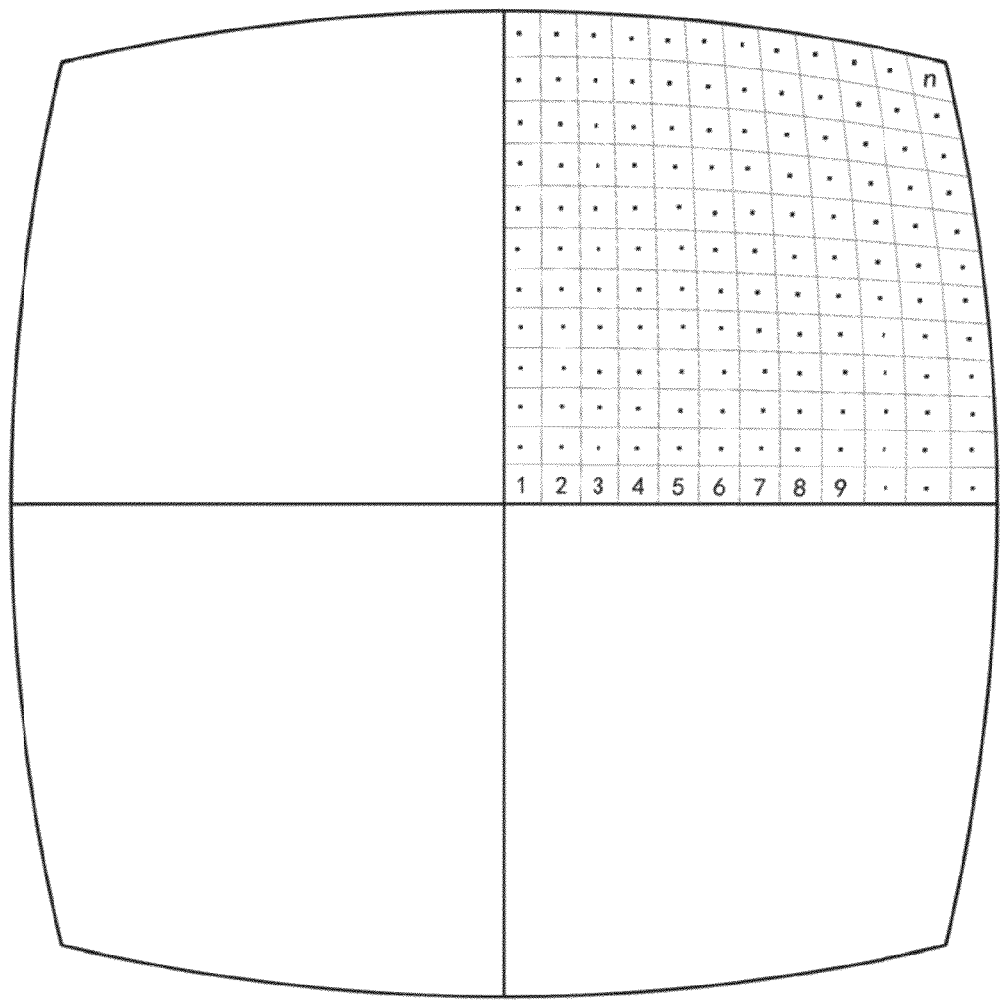
FIG. 5 is a schematic view illustrating arrangement of the LEDs of the spherical-screen device in subregions of the present invention.

A plurality of LED lamp panels and a module or case constituted by the LED lamp panels are disposed in a holder of the spherical-screen device of the present invention so as to form the 360° fully-spherical-screen device. The spherical-screen device of the present invention differs from a common spherical-screen device in that: the spherical-screen device of the present invention adopts the LED display screen; i.e., LED lamps are closely distributed inside the spherical screen according to the algorithm requirement. To facilitate processing and practical assembling, the LED lamps need to be formed into a plurality of LED lamp panels according to the subdivision principle, and are arranged on the LED lamp panels. The LED lamps of the present invention are arranged through the adaptive image algorithm; that is, the LED lamps of the present invention are not planar arrangement in rows and columns, but are uniformly distributed inside the spherical screen according to the requirements of the visual effect and also in conjunction with the image rectification method of the present invention. This can reduce the image distortion and simplify the image playing manner. Referring to FIG. 3, FIG. 4 and FIG. 5, there are shown schematic views of arrangement of the LED lamps of the present invention. A position of each of the LED lamps is uniformly distributed according to an angle at which an image is projected from the center of the spherical screen. The LED lamp panels, which are formed by the LED lamps of the present invention, are disposed planarly, but are spliced with each other at a predetermined angle and are extended to cover the entire spherical screen. The splicing angle is determined according to the subdivision algorithm shown in FIG. 1 and FIG. 2, and is 120°~180° and preferably 135°.

Figure 13:
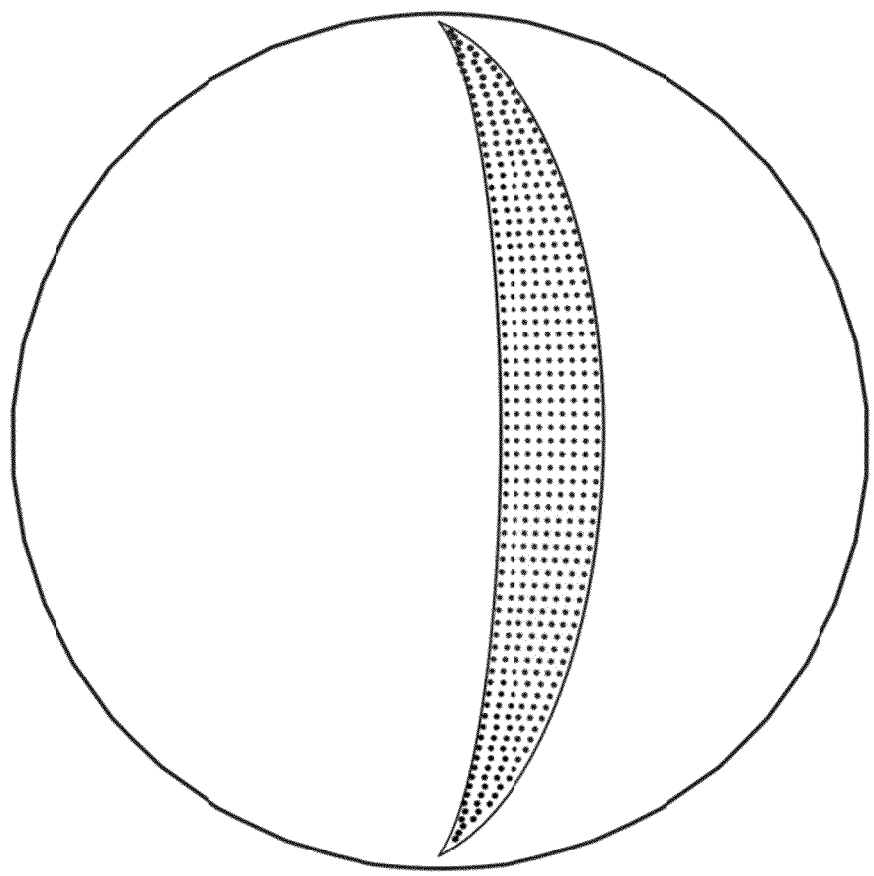
FIG. 13 is a schematic view illustrating another implementation of the LED spherical screen.

The LED screen of the present invention formed through algorithm processing is superior as compared to an LED screen formed in other ways. For example, as shown in FIG. 13, the LED lamps are arranged in a way of cutting a watermelon peel, which will lead to the result that the smaller the distance from the sphere center, the more irregularly the LED lamps are arranged. This will aggravate the image distortion.

Figure 6:
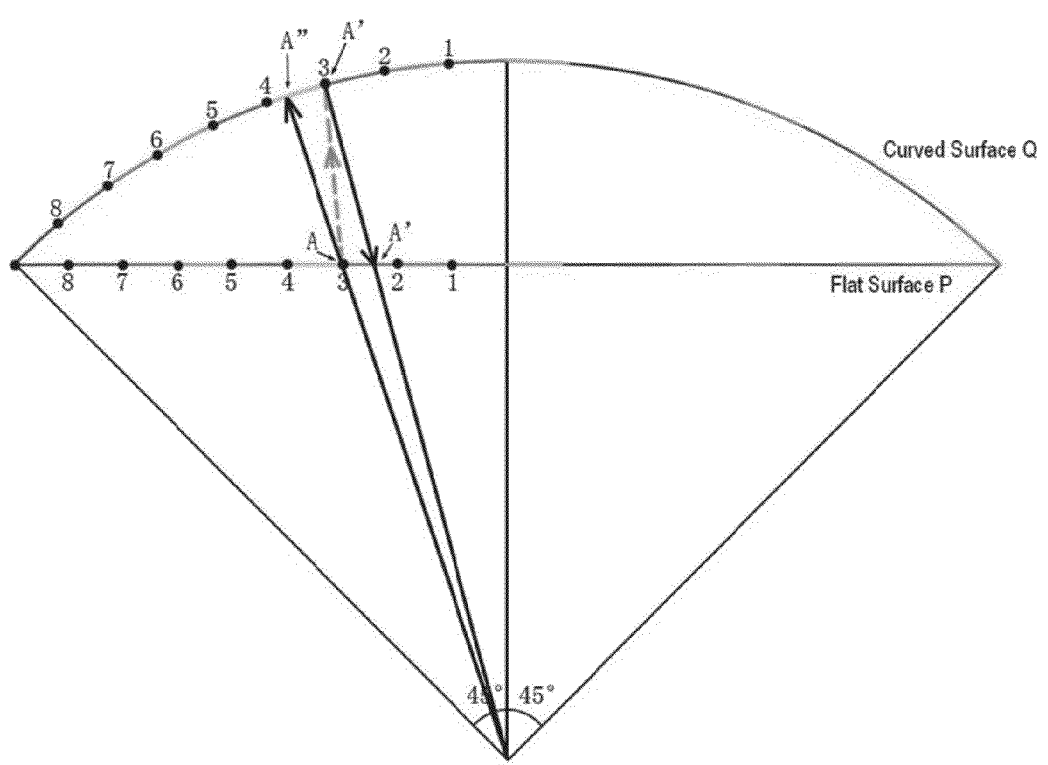
FIG. 6 is a schematic view illustrating an image generating method for the spherical-screen device of the present invention.
Figure 7:
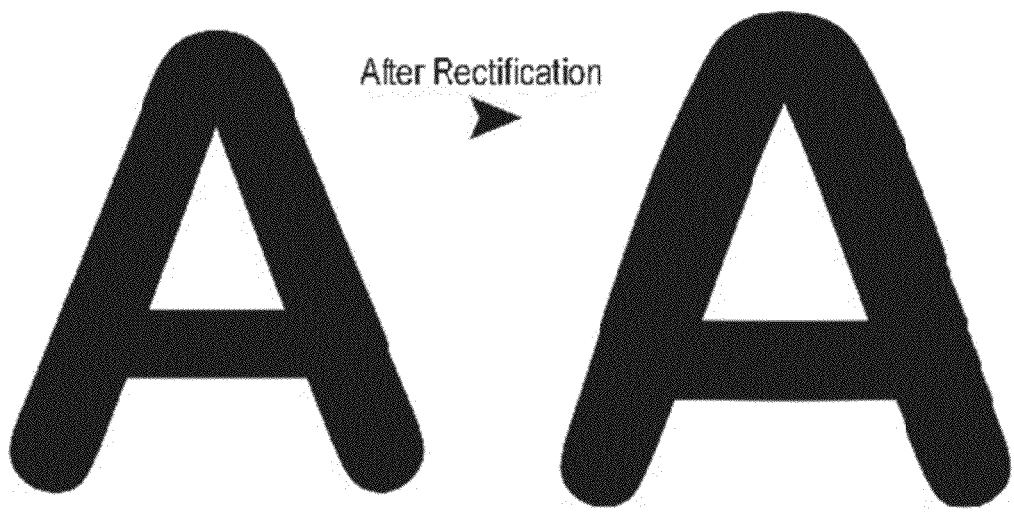
FIG. 7 is a schematic view illustrating image rectification of the spherical-screen device of the present invention.

Referring to FIG. 3 and FIG. 6, in the spherical-screen device of the present invention, a drive program is connected behind each of the LED lamp panels to play an image. In order to prevent the image from being distorted when being played by the spherical-screen device, the image rectification method is further adopted in the spherical-screen device of the present invention. When the LED screen plays the image, the drive program adopts the projection principle; i.e., when the image is played on a curved surface Q of the spherical screen, the image at a first point A in a flat surface P will be played at the position of a point A" in the curved surface Q according to the projection playing principle. Thereby, as shown in FIG. 7, the waist of the image A are curved and deformed outwards, which is in contradiction to the normal visual effect of the image.

In the image rectification method of the present invention, an arc curve of the spherical screen which corresponds to a radian of 90° can be equally divided into a plurality of segments. That is, as shown in FIG. 6, the curved surface Q is equally divided into a plurality of segments and, specifically, should be equally divided into eighteen segments, and a curve with a radian of 45° corresponds to nine segments with dividing points 1~8. Meanwhile, a to-be-displayed image (i.e., a straight line of the flat surface P) is also equally divided into the same number of segments. Then, an image parameter of a third point A' in the planar image is assigned to a first point A in the flat surface P. The third point is determined in the following way: according to the projection principle of the LED display driver program, the point A' of the curved surface Q is the to-be-displayed image on the arc curve that corresponds to the first point, connect the point A' of the curved surface Q with the sphere center, and thus a point falling in the flat surface P is the third point A'. The first point and the position thereof on the curved surface Q can be obtained through proportional calculation according to the same arc length and the same straight-line length. For example, when the point A is at the left end of the third segment counted from the left side of a middle point of the straight line, the corresponding point A' of the to-be-displayed image on the curved surface Q is also at the left end of the third segment counted from the left side of a middle point of the arc curve.

Figure 8:
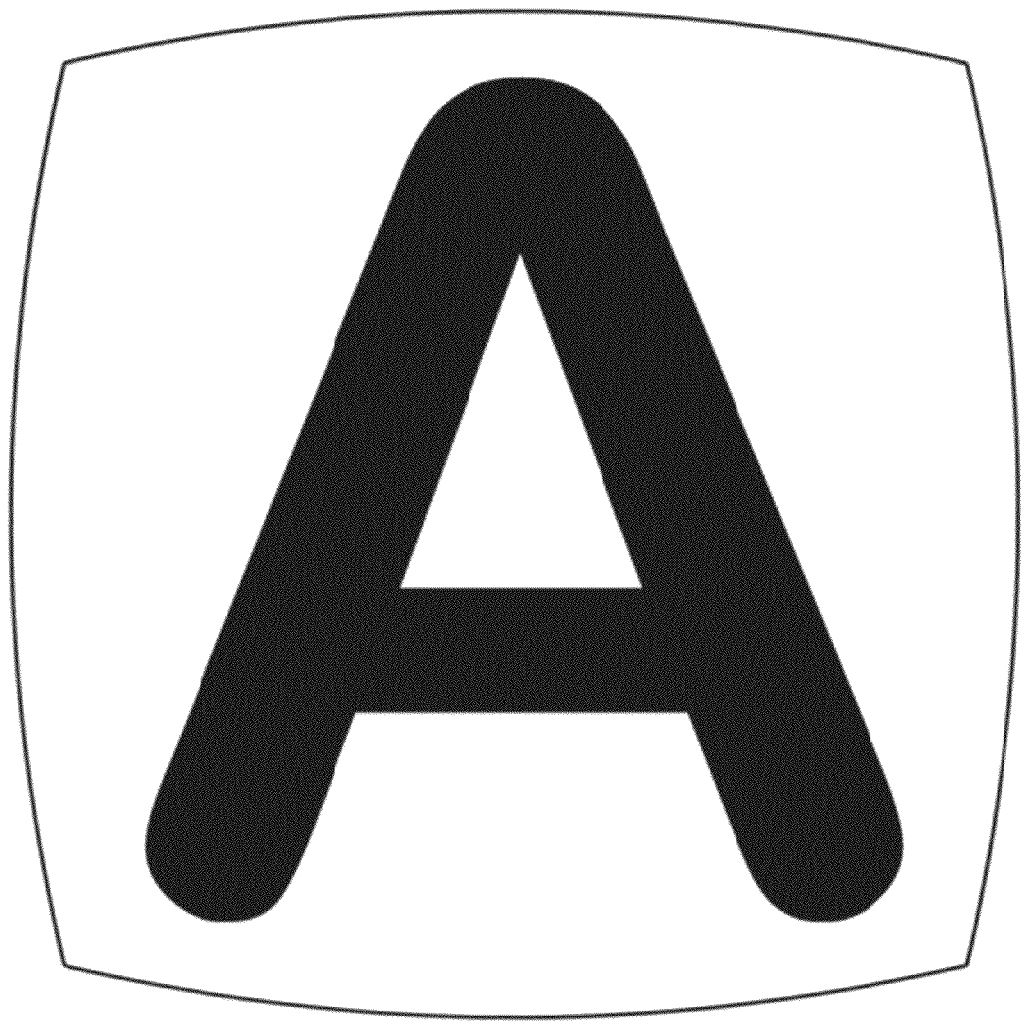
FIG. 8 is a schematic view illustrating LED displaying on the spherical screen of the spherical-screen device of the present invention.

The curved-surface display differs in nature from the flat-surface display, so when the curved-surface display directly plays a planar picture, image distortion will be caused and a person's viewing field cannot be restored so that the person cannot have a real visual feeling. The flat surface P shown in FIG. 6 has eighteen line segments having the same length, which are also eighteen equidistant line segments when being displayed on the curved surface Q. However, if the flat surface P has a first point A (the flat surface P is actually a planar image formed in the rendering or shooting process), then according to the principle that light travels in straight lines, an observer who stands at the circle center will see that the point A of the flat surface P is displayed at the position of the point A" on the curved surface Q (the curved surface Q is actually an image played on the LED spherical screen). According to the principle of the LED display driver algorithm, the position of the point A' on the curved surface Q is the correct displaying position of the point A actually. Therefore, according to the principle that light travels in straight lines, it is obtained through inverse operation that the point A' on the curved surface Q shall visually correspond to the position of the point A' in the flat surface P. Then, according to the image rectification method of the present invention, pixel information such as the color of the point A' in the flat surface P is assigned in advance to the position of the point A in the flat surface P. In this way, according to the operation principle of the LED display driver program, the correctly displayed image which is rectified and is convenient to be displayed on the spherical screen can be obtained. Referring to FIG. 7, the left part shows a planar image to be displayed, and the right part shows the image after being rectified; and FIG. 8 shows the image that is finally displayed on the curved surface.

It shall be appreciated that, in the image rectification method of the present invention, the more the segments of the arc curve and the straight line are equally divided into, the larger the calculation load will be but the smaller the distortion of the image will be. Therefore, the processing level needs to be set according to the processing capability of the hardware processing system used so that not only a rapid processing speed can be achieved but also rectification of the image can satisfy the visual requirement.

In the image rectification method of the present invention, a process of achieving a 90° arc curve is mainly illustrated, and the rectified planar image can be formed by processing each row in this way according to the processing requirement of the curved surface. Meanwhile, as described in the embodiment of the spherical-screen device of the present invention, all the spherical-screen devices of the present invention are projected outwards from a cube, whose center coincides with a sphere center, to form six spherical-screen regions with the same area. Each of the spherical-screen regions is rectified in advance through the aforesaid image rectification method. Thereby, six video cameras can be used to shoot from six angles. Then, after being processed by using the image rectification method of the present invention, the images can be played through the 360° fully spherical screen in the image playing manner of the existing LED screen.

In this way, image parameters of all the pixel points in the flat surface P are rectified one by one to achieve the image rectification effect as shown in FIG. 7, and the waist of the image A slightly protrudes outwards. As shown in FIG. 8, the rectified image displayed on the spherical-screen device is almost restored into a normal image meeting the visual effect, so that the image meeting the actual visual effect can be seen by the audience located on a viewing deck in the center of the spherical-screen device of the present invention.

LED lamps for image displaying are disposed at the second point of the spherical-screen device. Of course, in practice, the rectified image is projected to a proper position on the spherical screen according to the display driver program of the existing LED lamps, which makes the image inside the spherical screen meet the actual visual effect. In the spherical-screen device of the present invention, the lamp-panel drive program of the LED lamps can be disposed on the holder, and can be used to play a video, which is transcribed in advance, to produce a simulated situation.

Figure 9:
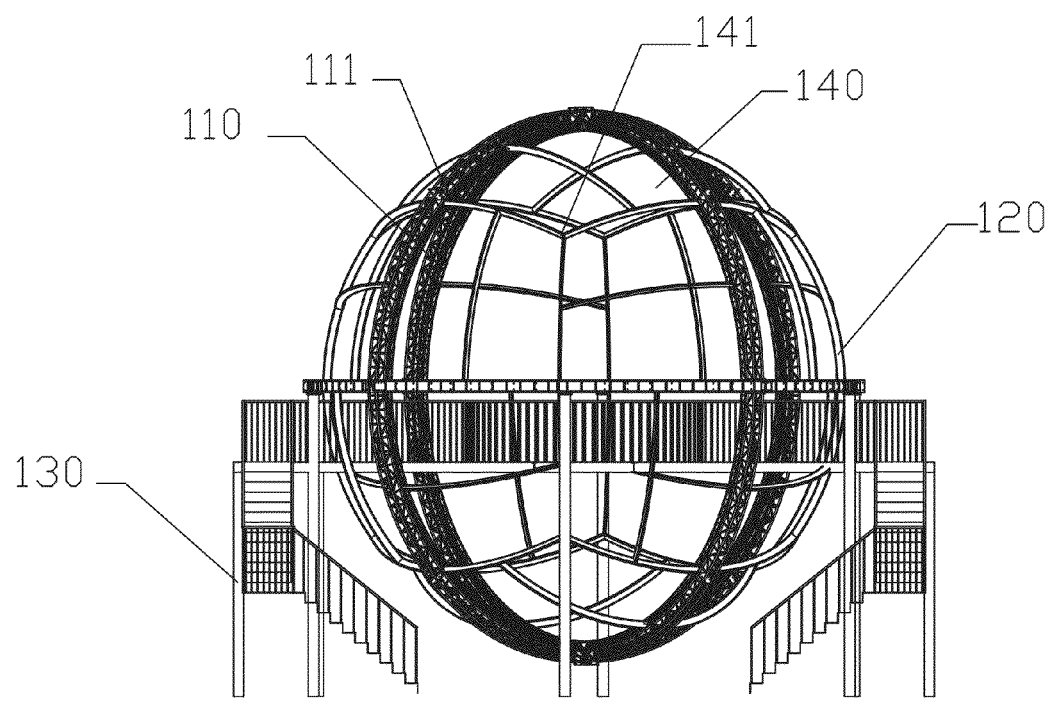
FIG. 9 is a schematic view illustrating a holder of the spherical-screen device of the present invention.
Figure 10:
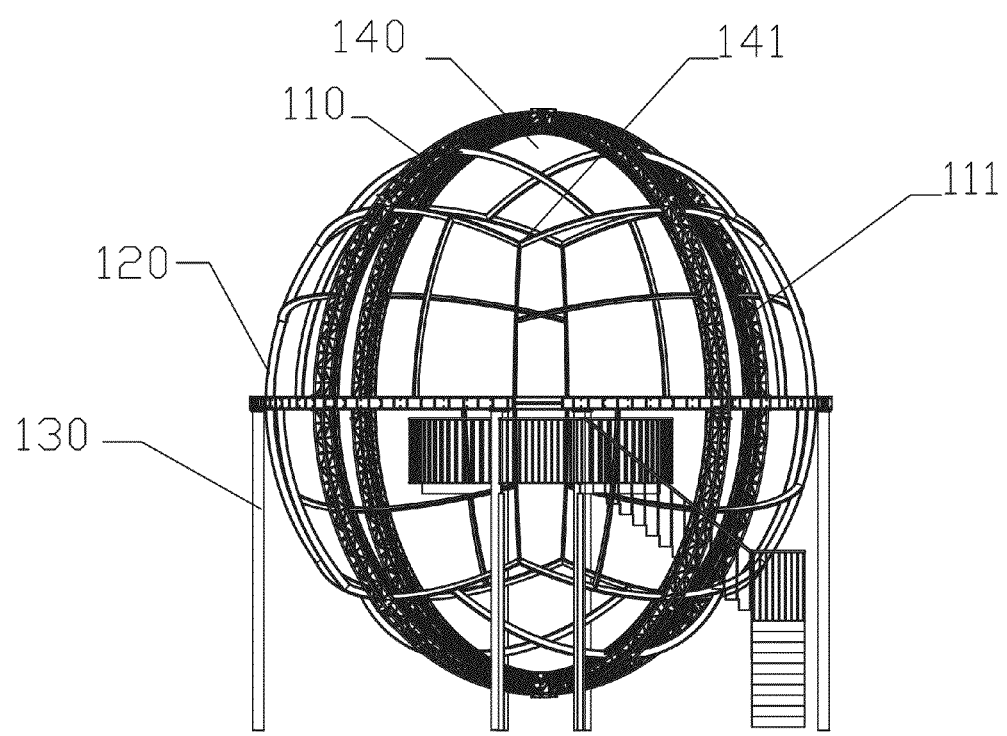
FIG. 10 is a schematic view illustrating the exterior of the holder of the spherical-screen device of the present invention from another angle.

In the spherical-screen device of the present invention, each module is formed by one or more LED lamp panels spliced together. The case needs to be fixed on a module support frame 110. As shown in FIG. 10, the case that is formed in advance by the LED lamp panels or the modules spliced together is fixed on an outer steel structural bracket, that is holder 120, so the outer steel structural bracket must adopt a load-carrying structure having an adequate strength. As shown in FIG. 9, the module support frame 110 extends inwards from the holder 120; and an upright post 130 is disposed outside the holder 120 to support the holder 120.

The holder 120 of the present invention fits the structure of the spherical-screen device, and is formed by three rings which are perpendicular to each other and are disposed along a spherical surface, and the rings must have an adequate loading capacity. Preferably, one of the rings is disposed at the equator and is connected to the upright post 130; and the other two rings are perpendicular to each other and are both perpendicular to the ring at the equator, as shown in FIG. 9.

The three rings 111 can separate the curved-surface into eight curved-surface regions 140 with the same area can, and each of the curved-surface regions is enclosed by a part of the three rings. Therefore, a delta connector 141 is disposed to further form a load-carrying supporting structure, from a central point of the part of each of the rings enclosing the curved-surface regions to a center of each of the curved-surface regions. A plurality of spliced LED lamp panels are further disposed in curved-surface sub-regions divided by the delta connector. The supporting structure thus formed can form a spherical-screen device with a larger space to meet the load-carrying requirement.

Figure 11:
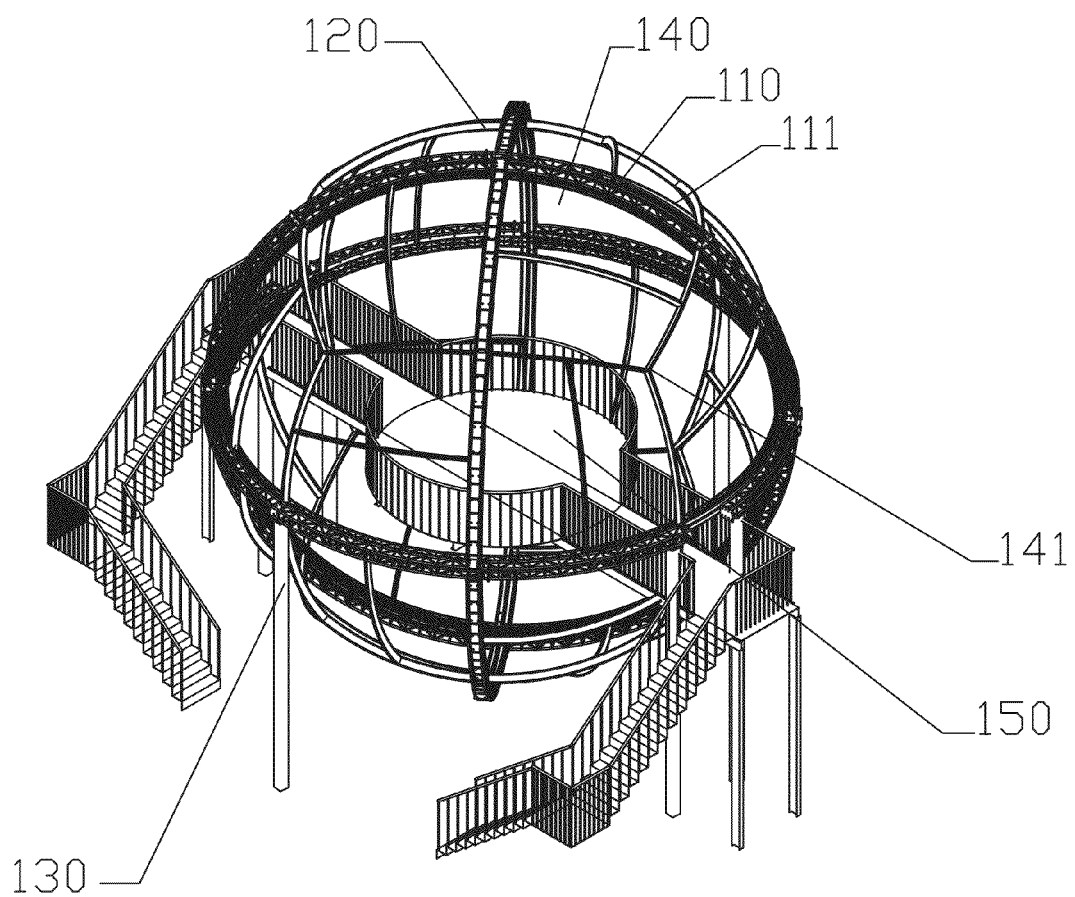
FIG. 11 is a schematic view illustrating a first preferred embodiment on how to mount the spherical-screen device of the present invention.
Figure 12:
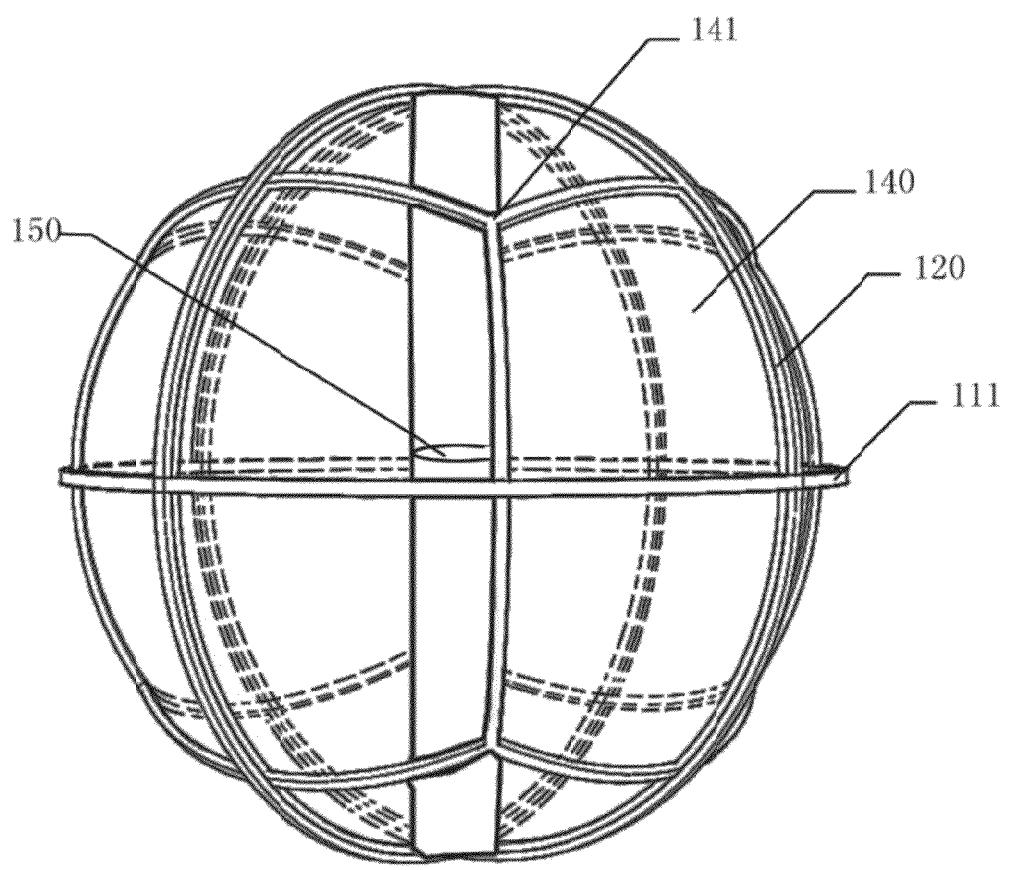
FIG. 12 is a schematic view illustrating a second preferred embodiment on how to mount the spherical-screen device of the present invention.

In the spherical-screen device of the present invention, a viewing deck 150 may be disposed in the center of the spherical screen and is set to be transparent, as shown in FIG. 11. In this case, a transparent deck may be installed into the spherical screen from the modules at two ends or from the four middle modules. Alternatively, the transparent deck may vertically extend through the entire spherical screen. As shown in FIG. 12, the viewing deck 150 is set as an elevator, and walls of the elevator are made of a transparent material so that image displaying of the LED lamps in the spherical screen can be viewed. Through a elevator additionally installed at the middle, the audience can be carried to a middle portion for viewing. In the spherical-screen device of the present invention, acoustoelectric and photoelectric apparatuses such as ventilation apparatuses and audio apparatuses as well as effects such as shaking, atomizing and water spraying may be additionally provided to increase the entertainment of the audience.

Figure 14:
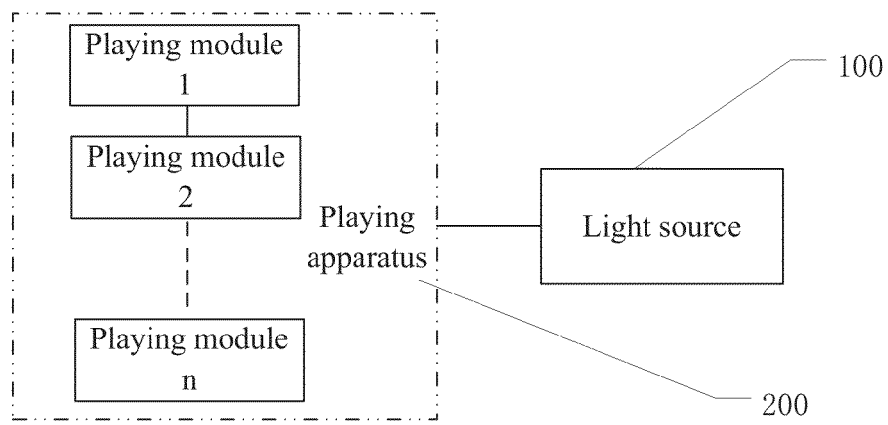
FIG. 14 is a structural block diagram of a spherical-screen playing system of the present invention.

Referring to FIG. 14, there is shown a structural block diagram of a spherical-screen playing system of the present invention. As shown, the spherical-screen playing system comprises: a light source 100 disposed inside a spherical screen and a playing apparatus 200 for playing a film.

Specifically, the light source 100 is a light emitting diode (LED) lamp device, which is a kind of solid-state semiconductor device and can convert electricity into light directly. The heart of an LED is a semiconductor chip. The chip has an end which is a cathode attached to a bracket and has the other end connected to an anode of a power source, and the entire chip is encapsulated by epoxy resin. The semiconductor chip consists of two parts, one part being a P-type semiconductor in which holes are dominant while the other part being an N-type semiconductor in which electrons are dominant. However, when the two semiconductors are connected, a "P-N junction" is formed therebetween. When a current acts on this chip through a wire, the electrons are pushed towards the P region where the electrons are combined with the holes and then emit energy in the form of photons. This is the light emitting principle of the LED. The wavelength of the light determines the color of the light, which is determined by the material forming the P-N junction. The LED lamp device 100 is a solid cold light source and is free of shortcomings such as burning out of a filament that emits light, thermal deposition and light attenuation. Under appropriate current and voltage, the LED lamp device 100 can have a service life of 60,000 hours to 100,000 hours, which is more than 10 times the service life of a conventional light source. In the present invention, using the LED as a light emitting source can significantly prolong the service life.

Further, in order to make the LED lamp device emit light uniformly on the spherical screen, the LED lamp device is distributed inside the spherical screen in the manner of module angle equipartition or isometric point extraction and is equally distributed on the spherical screen. It shall be appreciated that, the spherical screen is a 360° fully spherical screen or a 180° half spherical screen. Additionally, the LED lamp device may also be an LED lamp device consisting of LED lamps of three primary colors (RGB) to achieve full-color variation.

Referring to FIG. 14, the playing apparatus comprises a plurality of playing modules (a playing module 1, a playing module 2 to a playing module n). Each of the playing modules is adapted to play a video image. Thus, by controlling one or more of the playing modules to play one or more video images, the playing quality is improved significantly and the problem of high-resolution playing is solved.

Further, each of the playing modules may comprise a CPU control module, a display drive module, and an AC/DC power conversion module which are connected to each other. By controlling the display drive module and the AC/DC power conversion module through the CPU control module, the video image played by each playing module is controlled individually, that is modular control, so that a plurality of films at a level above the high-definition level can be played and the playing quality is improved.

Specifically, the CPU control module decodes the video image in a specified decoding manner, obtains information of each pixel of the video image through calculation, and then transmits information about colors and brightnesses of one or more pixel points to the display drive module. The display drive module is a switch that controls individual positions in a circuit of the LED lamp device through chip processing. The display drive module controls a drive circuit according to a preset program so that the LED array emits light regularly. Thereby, characters or graphs are displayed. The AC/DC power conversion module is adapted to supply power to the CPU control module and the display drive module.

Figure 15:
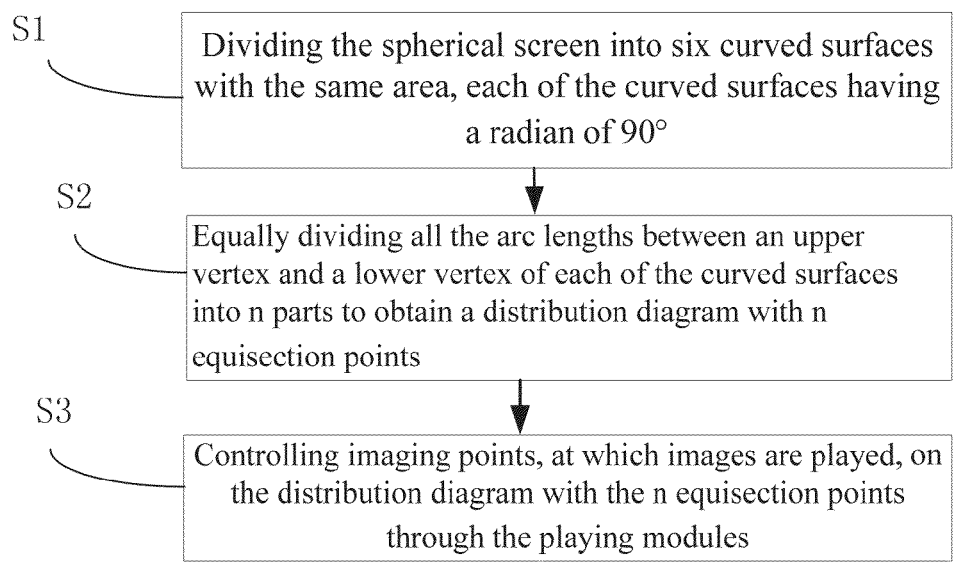
FIG. 15 is a flowchart diagram of an image generating method for the spherical-screen playing system of the present invention.

Additionally, the present invention further provides an image generating method for the spherical-screen playing system, which is adapted to distribute each point, at which an image is played, inside the spherical screen uniformly. As shown in FIG. 15, the image generating method comprises the following steps of:

S1. dividing the spherical screen into six curved surfaces with the same area, each of the curved surfaces having a radian of 90°;

S2. equally dividing each of the curved surfaces into n parts to obtain a distribution diagram with n equisection points; and S3. disposing the light source on the distribution diagram with the n equisection points.

The step S1 of dividing the spherical screen into six curved surfaces further comprises:

S11. taking a vector from a central point of the spherical screen to any point on the spherical screen as a rotating vector; and S12. rotating the rotating vector in six directions, i.e., upwards, downwards, leftwards, rightwards, frontwards and backwards, by 90° respectively to divide the spherical screen into six curved surfaces, as shown in FIG. 1.

The step S2 of obtaining a distribution diagram with n equisection points may be executed in a way as described below:

Referring still to FIG. 2, supposing that a vector from a sphere center to a center of one of the curved surfaces is a vector fe, then all the arc lengths of an arc ad are equally divided into n parts according to the vector angle formula $\cos(fa, fd) = (fa*fd)/[\text{module of } fa](\text{module of } fd)]$. In this way, it can be obtained through calculation that distances between all the points of the arc ad are equal to each other. Likewise, an angle included between fa and fb and an angle included between fb and fc are calculated according to the vector angle formula, and then the two angles are also equally divided into n parts. Points a1, a2, a3 ... a(n-1), b (wherein a1, a2, a3 ... a(n-1) are not shown in the drawings) can be obtained on the arc ab. Points d1, d2, d3 ... d(n-1), c (wherein d1, d2, d3 ... d(n-1) are not shown in the drawings) can be obtained on the arc dc. Then, an angle included between fa1 and fd1 is calculated, and the arc a1d1 is equally divided into n parts; and in this way, all the isometric points on the arc a1d1 can be obtained. Then, an angle included between fa2 and fd2 is calculated, and the arc a2d2 is equally divided into n parts; and in this way, all the isometric points on the arc a2d2 can be obtained. This goes on by analogy until equal division of the arc bc is completed. FIG. 4 is a schematic view illustrating distribution of n equisection points on one of the six curved surfaces. The larger the value of n is, the denser the points will be. When the density is large enough, the audience will feel that all the points are isometric.

According to the above descriptions about the spherical-screen playing system and the image generating method thereof of the present invention, the spherical-screen playing system comprises: a light source disposed inside a spherical screen and a playing apparatus for playing a film, wherein the light source is an LED lamp device and the playing apparatus comprises a plurality of playing modules. By controlling one or more of the playing modules to play one or more video images, the problem of high-resolution playing is solved. Meanwhile, using the LED lamp device, which has a long service life and a good illumination effect, as the light source can bring better enjoyment for the audience.

It shall be appreciated that, those of ordinary skill in the art can make modifications or replacements according to the above description, which shall all fall within the scope of the appended claims of the present invention.

The invention claimed is:

1. An image generating method for image rectification, comprising the steps of:
   dividing equally an arc curve of a spherical screen, which corresponds to a radian of 90°, into a plurality of curved surface segments with the same area, each of the curved surface segments having a radian of 90°;
   equally dividing each of the curved surface segments into n parts to obtain a distribution diagram with n equisection points, wherein n is a natural number;
   disposing a light source on the distribution diagram with the n equisection points;
   equally dividing, according to a planar image that needs to be displayed, a straight line of the planar image corresponding to the arc curve into a plurality of segments, the number of the segments of the straight line being equal to the number of the curved surface segments of the arc curve;
   assigning an image parameter of a first point in the planar image to a third point in the planar image;
   connecting a sphere center with a second point of a to-be-displayed image on the arc curve that corresponds to the first point, a point falling in the planar image being the third point; and
   displaying the rectified planar image on the arc curve of the spherical screen.

2. The image generating method of claim 1, wherein a plurality of LED lamps are disposed at the second point.

3. The image generating method of claim 1, wherein
   a spherical surface of said spherical screen can be divided into six identical curved-surface regions by connection lines between the center of the spherical surface and the projection points, the projection points are created on the spherical surface when half-lines are emitted from the center of the spherical surface towards eight vertices of a cube whose gravity center coincides with the center of the spherical screen, and each of the curved surfaces has a radian of 90°;
   each of the curved surfaces is equally divided into n parts to obtain a distribution diagram with n equisection points, wherein n is a natural number; and
   a plurality of LED lamps are disposed at the n equisection points of the distribution diagram.

4. A spherical-screen device adopting the image generating method of claim 1, comprising a spherical-screen structure formed by a plurality of LED lamp panels spliced together, wherein a plurality of LED lamps on the LED lamp panels are disposed at a second point and are displayed according to one or more corresponding image parameters.

5. The spherical-screen device of claim 4, wherein the spherical-screen structure adopts at least one module formed by a plurality of LED lamp panels spliced together, and the at least one module is fixed on a holder.

6. The spherical-screen device of claim 5, wherein the holder comprises a plurality of delta connectors, each of the delta connectors is disposed in 8 curved-surface regions with the same area of a spherical screen, and each of the curved-surface regions is formed by three rings which are perpendicular to each other and are disposed along a spherical surface.

7. The spherical-screen device of claim 6, wherein a plurality of spliced LED lamp panels are further disposed in curved-surface sub-regions divided by the delta connectors.

8. The spherical-screen device of claim 7, wherein adjacent ones of the LED lamp panels are spliced at an angle of 120°~180°.

9. The spherical-screen device of claim 7, wherein an upright post is further disposed outside the holder, the upright post is supported on the ring at the equator, and a module support frame on which the LED lamp panels are hooked is further disposed in the holder.

10. The spherical-screen device of claim 7, wherein an elevator parallel with the upright post is disposed in the spherical screen, and walls of the elevator are made of a transparent material.

11. A spherical-screen playing system, comprising:
  a spherical screen,
    wherein the spherical screen is divided into six curved surfaces with the same area, each of the curved surfaces having a radian of 90°,
    wherein each of said curved surfaces is divided into n parts to obtain a distribution diagram with n equisection points;
  a light source disposed inside a spherical screen,
    wherein the light source is disposed on the distribution diagram with the n equisection points; and
  a playing apparatus for playing a film, wherein the light source is an LED lamp device, and the playing apparatus comprises a plurality of playing modules.

12. The spherical-screen playing system of claim 11, wherein each of the playing modules further comprises a CPU control module, a display drive module, and an AC/DC power conversion module which are connected to each other.

13. The spherical-screen playing system of claim 11, wherein the LED lamp device is distributed inside the spherical screen in the manner of module angle equipartition or isometric point extraction.

14. The spherical-screen playing system of claim 11, wherein the LED lamp device is a full-color LED lamp device consisting of LED lamps of three primary colors (RGB).

15. An image generating method adapted to distribute each point at which an image is played inside a spherical screen uniformly, the method comprising the steps of:
  dividing the spherical screen into six curved surfaces with the same area, each of the curved surfaces having a radian of 90°;
  equally dividing each of the curved surfaces into n parts to obtain a distribution diagram with n equisection points, wherein n is a natural number; and
  disposing a light source on the distribution diagram with the n equisection points.

16. The image generating method of claim 15, wherein the step of dividing the spherical screen further comprises:
  taking a vector from a central point of the spherical screen to any point on the spherical screen as a rotating vector; and
  rotating the rotating vector in six directions, i.e., upwards, downwards, leftwards, rightwards, frontwards and backwards, by 90° respectively to divide the spherical screen into six curved surfaces.

* * * * *